United States Patent [19]

Tsuruoka et al.

[11] Patent Number: 5,107,275
[45] Date of Patent: Apr. 21, 1992

[54] EXPOSURE CONTROL SYSTEM

[75] Inventors: Yuji Tsuruoka; Yoshikiyo Yui, both of Kawasaki, Japan

[73] Assignee: Canon Kabushiki Kaisha, Tokyo, Japan

[21] Appl. No.: 611,442

[22] Filed: Nov. 13, 1990

Related U.S. Application Data

[63] Continuation of Ser. No. 456,453, Dec. 26, 1989, abandoned.

[30] Foreign Application Priority Data

Dec. 28, 1988 [JP] Japan ................. 63-328826

[51] Int. Cl.⁵ .............................. H04N 1/21
[52] U.S. Cl. ..................... 346/1.1; 346/108
[58] Field of Search ............ 346/108, 107 R, 160, 346/76 L, 1.1; 358/296, 300, 302; 250/336.1, 338.1

[56] References Cited

U.S. PATENT DOCUMENTS 4,593,207  6/1986  McRight, Jr. et al. .......... 250/338.1

Primary Examiner—Mark J. Reinhart
Attorney, Agent, or Firm—Fitzpatrick, Cella, Harper & Scinto

[57] ABSTRACT

An exposure control system includes a pulsed light source; a photoelectric converting device for receiving a portion of pulsed light from the pulsed light source and for producing a photoelectric signal; an integration gate producing device for producing an integration gate signal after a predetermined specified time from the production of an emission synchronization signal related to the pulsed light source, wherein the specified time is set to be not greater than a delay time from the production of the emission synchronization signal to the start of actual emission of the pulsed light source; and integrating device for integrating the photoelectric signal from the photoelectric converting device during a time period in which the integration gate producing device produces the integration gate signal; and a control device for integrating a resultant of the integration by the integrating device each time one pulse light is emitted, the control device discriminating whether the result of integration is less than a predetermined or not, each time one pulse light is emitted, and the control device stopping the emission of the pulsed light when the result of integration becomes not less than the predetermined.

14 Claims, 6 Drawing Sheets

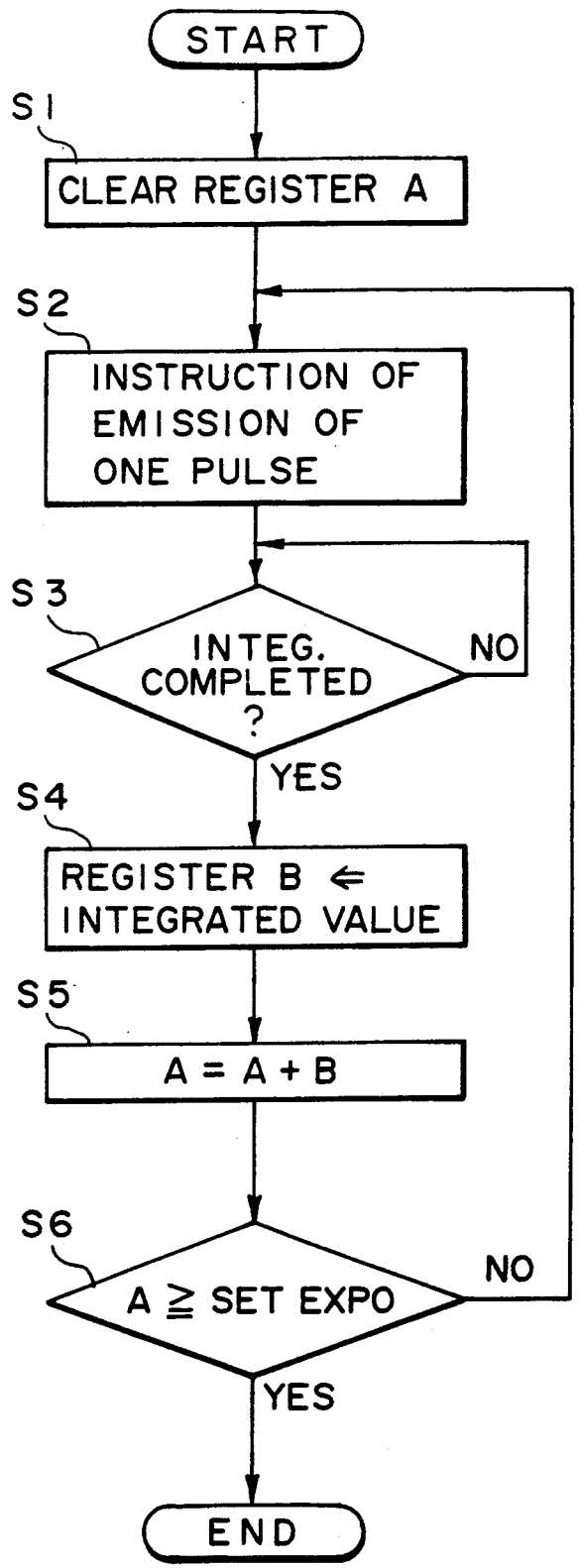
F I G. 3

1

EXPOSURE CONTROL SYSTEM

This application is a continuation of prior application, Ser. No. 07/456,453 filed Dec. 26, 1989, now abandoned.

FIELD OF THE INVENTION AND RELATED ART

This invention relates to an exposure apparatus having a printing radiation energy source which comprises a light source for producing a pulsed laser beam. More particularly, the invention is concerned with an exposure control system usable in an exposure apparatus having an excimer laser as a printing radiation energy source for printing a pattern of a mask on a semiconductor wafer, for controlling the amount of exposure.

FIG. 5 shows a known type exposure control system. In the illustrated arrangement, a pulsed laser beam from an excimer laser 1 is transformed by an illumination system 12 into a having a uniform distribution irradiated onto a mask M. By this, a pattern formed on the mask M is projected through a projection optical system 13 on a wafer W and printed thereon. On the other hand, a portion of the light emanating from the illumination system 12 is reflected by a mirror 14 and is received by a photosensor 15. The photosensor 15 comprises a photoelectric converting element such as a pyroelectric device and is adapted to produce one pulse output signal in response to reception of one pulse of the laser beam. Pulse number integrating circuit 16 receives the output signals from the photosensor 15 and, by integrating the number of pulses, it counts the total number of the laser beam pulses impinging on the wafer W.

Generally, the energy of the pulsed laser beam from an excimer laser can be preset within a certain range, and a central processing unit (CPU) 17 calculates the total energy inputted to the illumination system 12, from the product of the preset energy and the total number of the pulses counted by the pulse number integrating circuit 16. On the other hand, the amount of exposure of the wafer W can be calculated from the product of the total energy inputted to the illumination system 12 and the overall transmission factor of the illumination system 12, the mask M and the projection optical system 13. Therefore, the CPU 17 calculates the amount of exposure each time one laser beam pulse is emitted. When the total exposure amount becomes equal to or greater than a desired exposure amount, the CPU 17 actuates a laser control 18 to stop the light emission of the excimer laser 11.

SUMMARY OF THE INVENTION

However, the pulses from an excimer laser are variable in energy, although the variation is small. In order to assure precise control of the exposure amount, it is desirable to precisely detect the energy of each pulse or the total energy of a series of pulses from the excimer laser.

It is accordingly a primary object of the present invention to provide an exposure control system by which the energy of each pulse or the total energy of a series of pulses from an excimer laser can be measured more precisely, such that the exposure amount can be controlled more precisely.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 is a flow chart, for explaining the sequence of exposure control to be made in accordance with the FIG. 1 embodiment.

DESCRIPTION OF THE PREFERRED EMBODIMENTS

Figure 1:
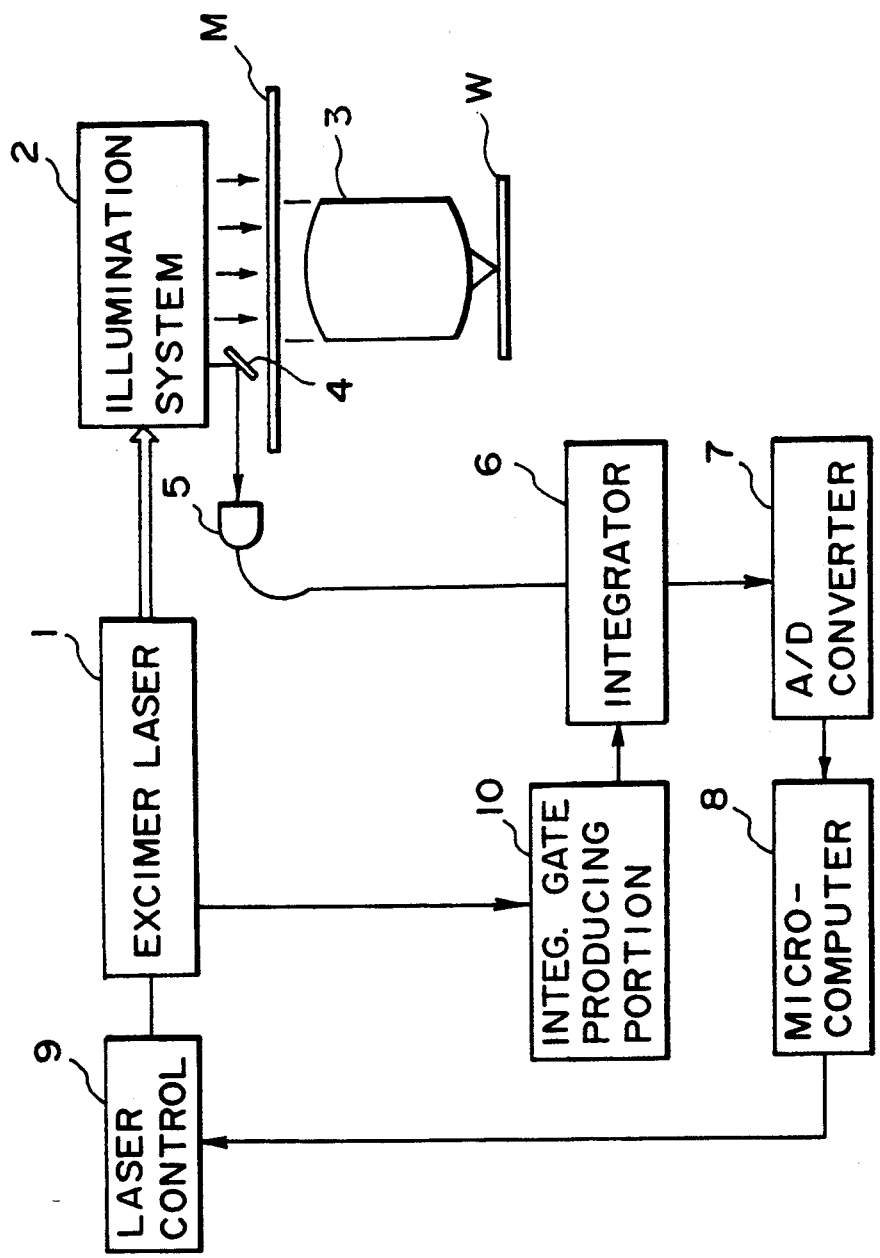
FIG. 1 is a diagram showing the basic structure of an exposure control system according to an embodiment of the present invention.

FIG. 1 is a diagram, schematically showing the basic structure of an exposure control system according to an embodiment of the present invention. In FIG. 1, an excimer laser 1 is a light source having a sealingly contained KrF or XeCl gas, for emitting a pulsed laser beam. The laser beam produced by the excimer laser device 1 is inputted to an illumination system 2. The illumination system 2 includes, for example, a beam shaping optical system and an optical integrator and is adapted to shape the received laser beam into a desired beam shape and to emit light having a uniform light distribution. Along the path of the light emanating from the illumination system 2, there are disposed a mask M (or a reticle) having an integrated circuit pattern formed thereon, a projection optical system 3 and a wafer W. By the illumination, the integrated circuit pattern formed on the mask M is projected and printed on the wafer W through the projection optical system 3.

On the other hand, a portion of the light emerging from the illumination system 2 is reflected by a mirror 4 and is received by a photoelectric converting surface of a sensor 5. Since the duration of each pulse light emitted by the excimer laser 1 is very short, for example, on an order of several tens of nanoseconds, as for the sensor 5, it is preferable to use a photoelectric converting element such as a PIN photodiode or a biplanar phototube, having a response time of not longer than several nanoseconds. Also, since the output beam of the illumination system 2 has a uniform light distribution, the power of the light impinging on the sensor 5 is in a proportional relationship with the power of the light impinging on the wafer W. Accordingly, by measuring an electric output signal of the sensor 5, it is possible to monitor the power of the light upon the wafer W.

Each output signal of the sensor 5 is applied to an integrator 6 and, in response to one pulse of the laser beam, one output signal of the sensor is electrically analog-integrated. The integrated value is then converted by an analog-to-digital converter (hereinafter "A/D converter") 7 into a digital value which is stored into a microcomputer 8. The microcomputer 8 serves to sequentially integrate the integrated values which are in the form of digital signals and each of which corresponds to one pulse. Then, the microcomputer compares the resultant integrated value with the amount of exposure of the wafer W as set in advance and, when the former becomes equal to or greater than the set exposure amount, it supplies an instruction to a laser control 9 to stop the light emission of the excimer laser 1. In this manner, the exposure control is effected.

Integration gate producing portion 10 produces an integration gate for determining the integration period, to the integrator 6. For best understanding of the operation timing related to the integrator 6, reference will now be made to the timing chart of FIG. 2.

Figure 2:
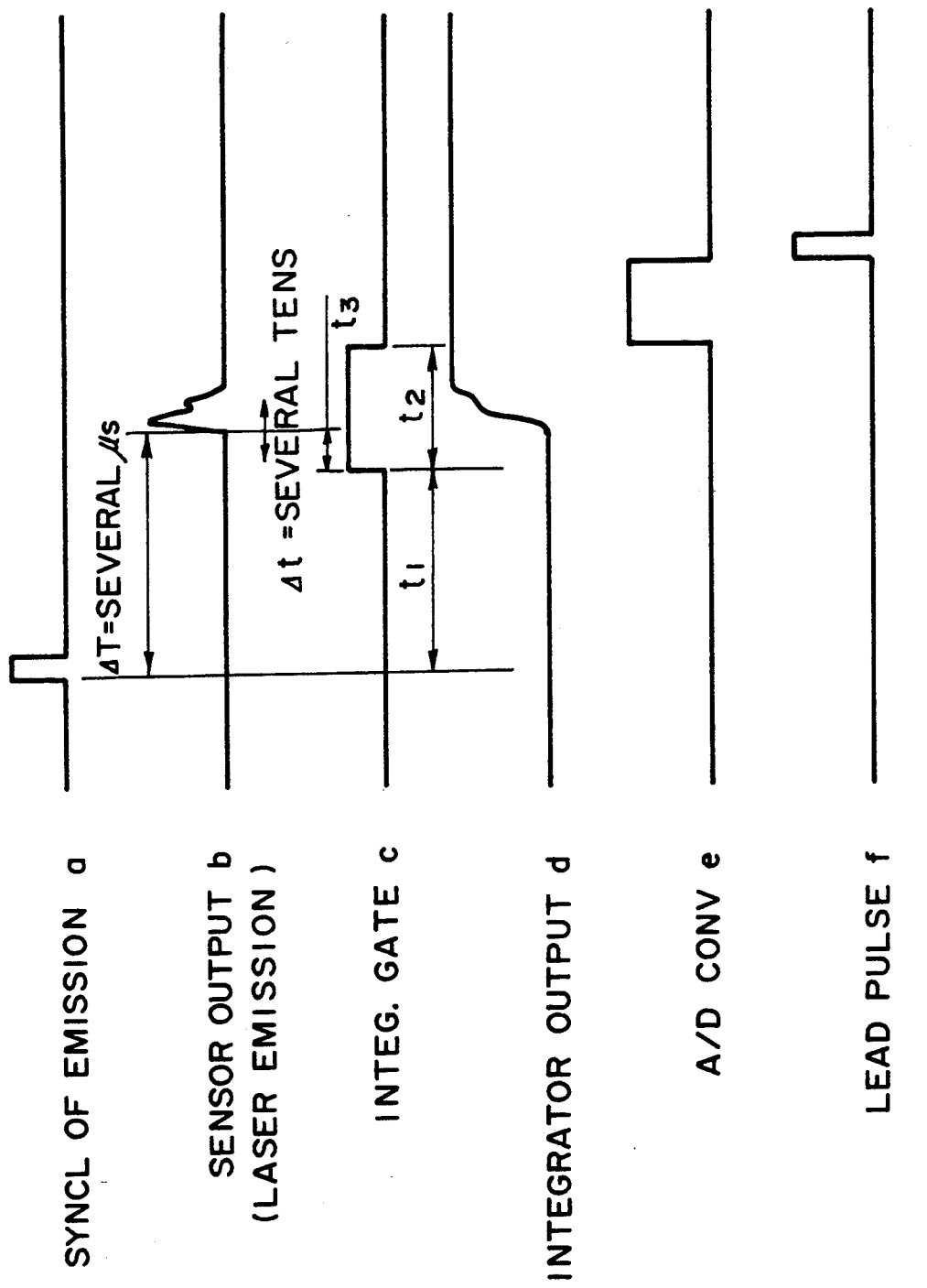
FIG. 2 is a timing chart, for explaining the operation timing of an integrator used in the FIG. 1 embodiment.

In FIG. 2, an emission synchronization signal a is a synchronization signal which is outputted from the excimer laser 1 several microseconds ($=\Delta T$) before the timing of the actual light emission. As for such an emission synchronization signal a, a trigger signal of a thyratron, which normally serves as a trigger for the laser emission, is used. As a result, the delay time $\Delta T$ from this synchronization timing to the timing of actual laser emission is substantially fixed at several microseconds.

Accordingly, by using this emission synchronization signal a as a reference and by defining an integration gate c for a time period $t_2$ after a specified time $t_1$ from the reference (the specified time will be explained later in detail), it is possible to assure that the timing b of the actual laser emission is kept, constantly, within the pulse duration ($=t_2$) of the integration gate c. For enhancement of the accuracy of the integrated value, it is effective if the width $t_2$ of the integration gate c is short enough and, in this embodiment, $t_2$=several hundreds of nanoseconds. This is because noise can be included in the output signal b of the sensor 5 which is provided to convert the emitted laser into an electric signal and that the offset level thereof can vary minutely. The integrator 6 must be so sensitive as to ensure integration of the output signal b having a small width on an order of several tens of nanoseconds, otherwise such these noise and fluctuation components have a large affect on the integration.

When the sensor output signal b is integrated by the integrator 6 for the period ($=t_2$) of the integration gate c, an output d of the integrator 6 is converted by the A/D converter 7 into a digital amount (A/D converted output signal e) and, in response to the completion of the conversion, a lead pulse f is outputted to the microcomputer 8.

When the microcomputer 8 detects this lead pulse f, it reads out the integrated value from the A/D converter 7 and executes the exposure amount control according to the read value.

Next, the procedure of this exposure amount control will be explained, by reference to the flow chart of FIG. 3.

First, when an exposure instruction is supplied from an unshown keyboard of the microcomputer 8, first at step S1, a register A is zero-cleared. The register A is a register which serves to store therein the value obtained by integrating the integrated values of the photoelectrically converted outputs. For this register, an internal register of the microcomputer 8 may be used or, alternatively, it may be defined on an unshown memory. Next, at step S2, an instruction of one pulse emission is outputted to the laser control 9, whereby the excimer laser 1 produces one pulse of laser beam. In response, an emission synchronization pulse a (FIG. 2) is outputted. When the integration is completed as described with reference to FIG. 2, a lead pulse f is outputted.

At step S3, the microcomputer 8 checks the lead pulse f and discriminates whether the integration is completed or not. When the lead pulse f is detected, at step S4, the integrated value is stored into a register B. Then, at step S5, the integrated value in the register B is added to the integrated value in the register A and, again, the resultant is stored into the register A. Subsequently, at step S6, the integrated value, which is the content of the register A, is compared with a set exposure amount which has been inputted in advance from the keyboard of the microcomputer 8 and which has been stored into the memory. If they are equal to each other or to the integrated value, i.e., the value of the register A is greater, the operation is finished. If not so, the sequence goes back to step S2 and an instruction of one pulse emission is outputted again and the above-described operation is repeated until the value of the register A is within the desired change.

In the manner described above, the microcomputer 8 reads an integrated value for each emission of one pulse, calculates an integrated value and compares the obtained integrated value with the set exposure amount each time one pulse is emitted, to thereby control the exposure amount.

Figure 6:
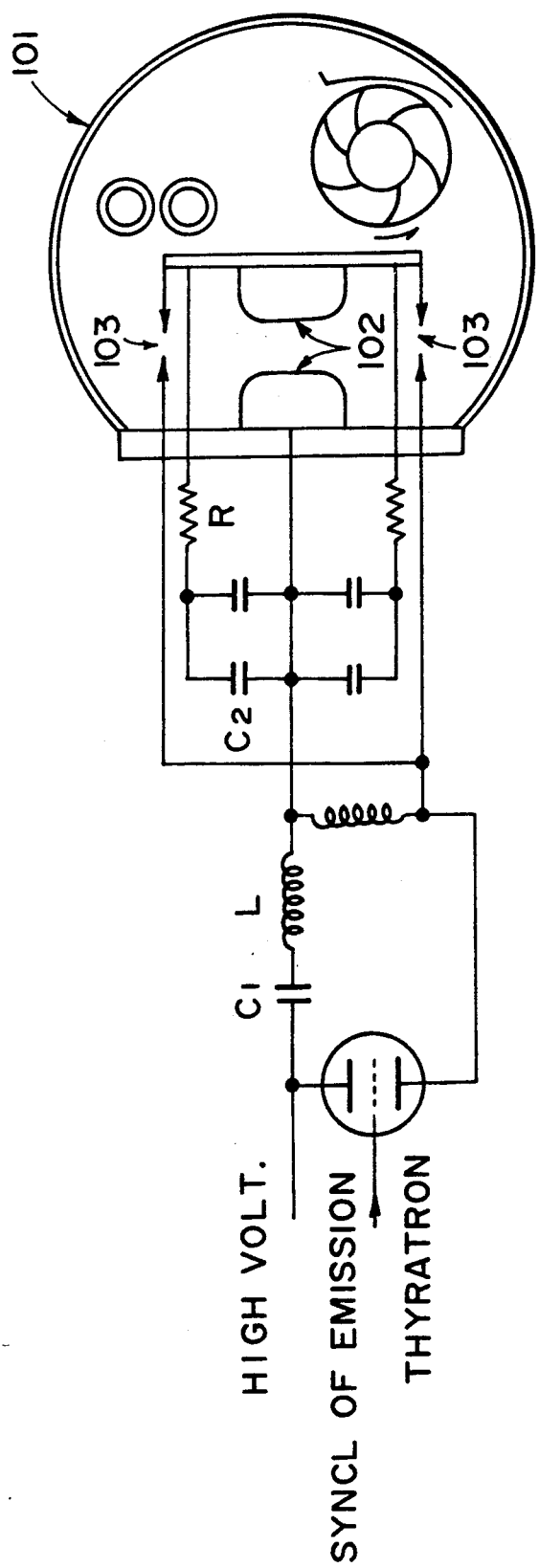
FIG. 6 is a schematic view showing the basic structure of an excimer laser.

Now, the manner of determination of the specified time $t_1$ will be explained in detail. However, prior to this explanation, reference will first be made to the general structure of an excimer laser. FIG. 6 shows the structure of a typical excimer laser. The excimer laser is a device in which a gas sealed in a chamber 101 is rendered into an excited state and, when the atoms of the excited gas fall into a ground state, a laser beam is produced.

The excited state can be created by applying a high voltage to primary electrodes 102 and by causing electric discharge therebetween. For smoothly progressing the discharging, a trigger, called preparatory ionization, is necessary. The preparatory ionization can be achieved by causing electric discharge between preparatory electrodes 103 for each primary electrode. Usually, a high voltage is applied between the preparatory electrodes 103 and, by applying the emission synchronization a to the grid of a thyratron as a trigger signal, the preparatory ionization is started. At a time of several hundreds of nanoseconds to several microseconds after execution of the preparatory ionization, electric discharging occurs between the primary electrodes 102. Therefore, the actual light emission occurs with a delay of several hundreds of nanoseconds to several microseconds after the emission synchronization a. Namely, the specified time $t_1$ can be determined, based on measuring such a delay time $\Delta T$ in advance. Actually, however, the time $\Delta T$ from the emission synchronization to the actual emission is variable due to jitter. Such jitter may be caused by, for example, (1) variation in the applied voltage between the electrodes, (2) a change in the state of the gas in the chamber, (3) a change in the repetition frequency of light emission and (4) abrasion of the electrode. The jitter may have a width $t_3$ (see FIG. 2) which is approximately several tens of, to several hundreds of nanoseconds. Therefore, preferably variation due to such jitter may be measured in advance and the specified time $t_1$ may be set while taking into account such variation.

Namely, the specified time $t_1$ may preferably be determined to satisfy the following relation:

$$t_1 \leq \Delta T_{mini}$$

where $\Delta T_{mini}$ is the minimum value of the delay time $\Delta T$ which is determined in consideration of the width $t_3$ of the jitter. Since the width $t_2$ of the integration gate c is on an order of several hundreds of nanoseconds as described hereinbefore, the determination of the specified time in the manner described above does not affect the integration of the sensor output b.

In the embodiment described hereinbefore, the integrator 6 produces an analog integrated value which is converted by the A/D converter 7 into a digital value, which in turn, is transferred to the microcomputer 8. However, the integrator 6 and the A/D converter 7 may be replaced by a digital integrator means such as shown in FIG. 4.

Figure 4:
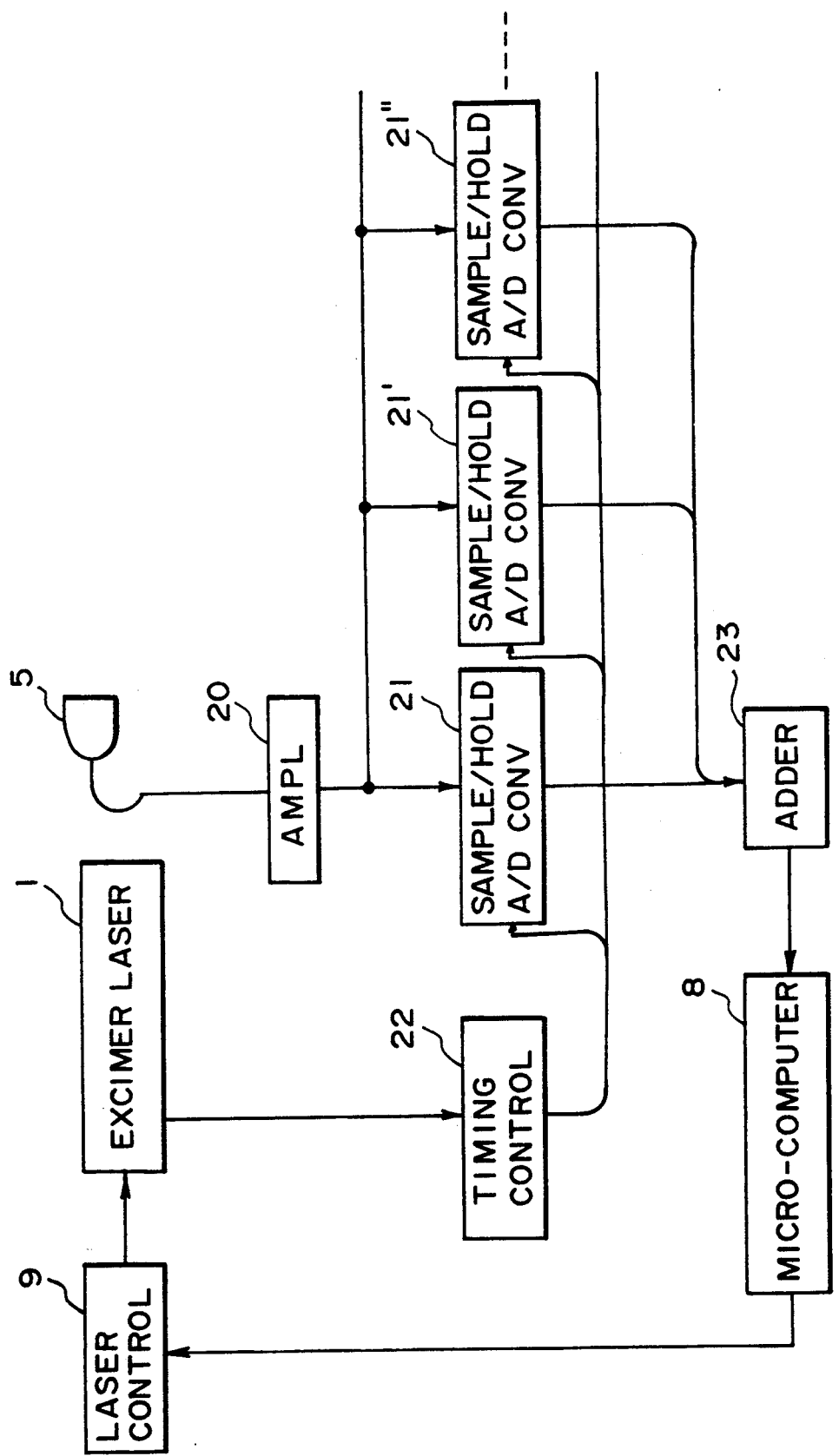
FIG. 4 is a diagram showing the basic structure of an exposure control system according to an embodiment of the present invention, wherein a digital integrator is used.
Figure 5:
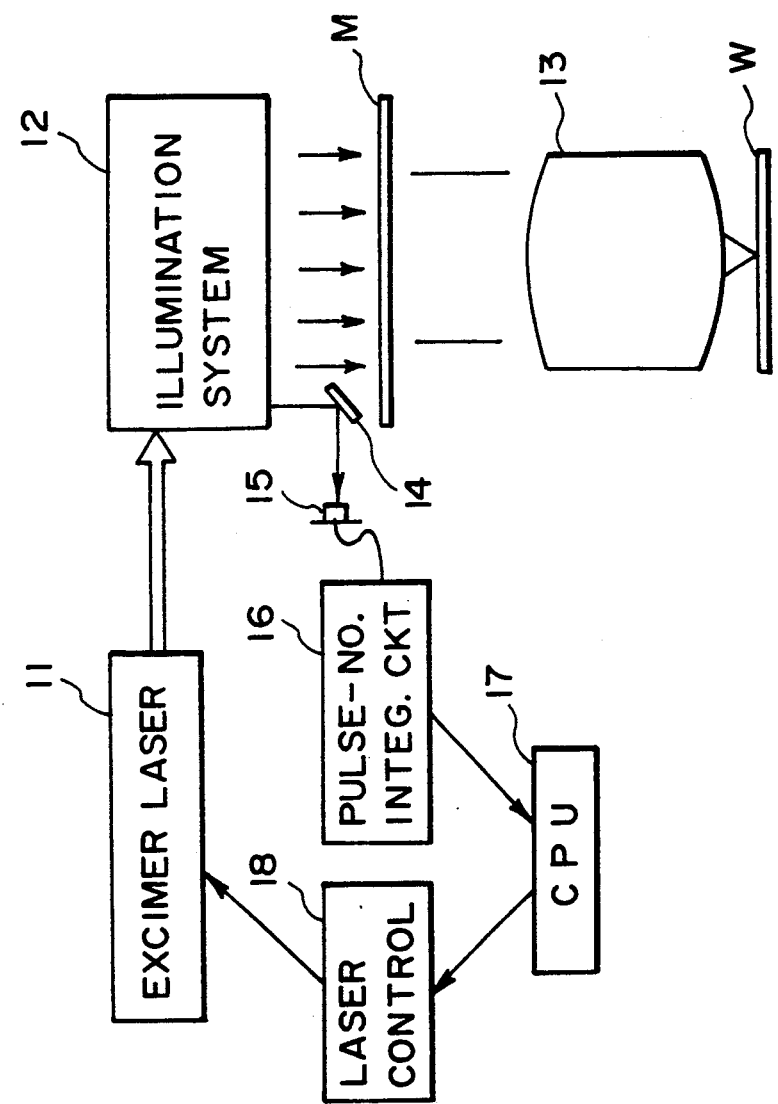
FIG. 5 is a diagram showing the basic structure of a known type exposure control system.

Referring to FIG. 4, an output of a photosensor 5 is amplified by an amplifier 20 and then is supplied to each sample-hold A/D converter 21, 21' or 21''. On the other hand, the synchronization signal a outputted from the excimer laser 1 and indicative of mearly close emission, is supplied to a timing control 22. On the basis of the supplied synchronization signal a, the timing control 22 produces sampling clocks for providing sampling timing of each sample-hold A/D converter 21, 21' or 21''.

The sampling clocks are applied to the sample-hold A/D converters 21-21'' and, at the sampling clock period, the output of the amplifier 20 is sampled and held and is analog-to-digital converted.

It is to be noted that, in general, the sampling period of an A/D converter is, at the best, about 1 nanosecond, even if the converter is of a highest-speed type. Thus, as compared with to the pulse duration of the excimer laser 1, which is about 20 nanoseconds, the sampling period is not sufficient. Therefore, in order to enhance the accuracy, it is necessary to make the sampling period shorter. In the present embodiment, in consideration of this, a plurality of sample-hold A/D converters (only three are illustrated) are disposed in parallel to each other, such as shown in FIG. 4, and the sampling clocks provided to them are mutually shifted, each by several hundreds of picoseconds. With this arrangement, the sampling period can be shortened substantially. Digital outputs of these sample-hold A/D converters 21, 21', 21'', ... are sequentially added to each other by using an adder 23, whereby an integrated value can be obtained each time one pulse is emitted. Then, by integrating the output of the adder 23 through the microcomputer 8, the exposure amount is detected. The operation following this may be the same as that in the foregoing embodiment, and the exposure control can be executed.

In accordance with the present invention, as described hereinbefore, the pulsed light from an excimer laser, or otherwise, is photoelectrically converted by means of a photosensor having a high response speed and the output thereof is integrated. As a result, the energy of each pulse can be detected very precisely. Accordingly, it is possible to reduce the number of pulses of light, necessary for the exposure and, as a result, it is possible to increase the throughput of the exposure apparatus. Also, since the pulse energy from an excimer laser or otherwise can be monitored continuously, it is possible to reduce "under exposure" due to malfunction of the laser, for example.

While the invention has been described with reference to the structures disclosed herein, it is not confined to the details set forth and this application is intended to cover such modifications or changes as may come within the purposes of the improvements or the scope of the following claims.

What is claimed is:

1. An exposure control system, comprising:

a pulsed light source;

photoelectric converting means for receiving a portion of pulsed light from said pulsed light source and for producing a photoelectric signal;

integration gate producing means for producing an integration gate signal after a predetermined specified time from the production of an emission synchronization signal related to said pulsed light source, wherein said specified time is set to be not greater than a delay time from the production of the emission synchronization signal to the start of actual emission of said pulsed light source;

integrating means for integrating the photoelectric signal from said photoelectric converting means during a time period in which said integration gate producing means produces the integration gate signal; and control means for integrating a resultant of the integration by said integrating means each time one pulse light is emitted, said control means discriminating whether the result of integration is less than a predetermined or not, each time one pulse light is emitted, and said control means stopping the emission of said pulsed light when the result of integration becomes not less than the predetermined.

2. A system according to claim 1, wherein the emission synchronization signal is outputted from said pulsed light source.

3. A system according to claim 2, wherein said pulsed light source comprises an excimer laser.

4. A system according to claim 1, wherein the specified time is set while taking into account jitter.

5. An exposure method for exposing a semiconductor wafer to a pattern of a mask with pulsed laser light emitted from an excimer laser, to transfer the pattern of the mask onto the wafer, said method comprising the steps of:

providing a photoelectric sensor for receiving a portion of the pulsed laser light emitted from the excimer laser and for producing an output;

placing the mask at a predetermined first position;

placing the wafer at a predetermined second position for transferring the mask pattern to the wafer;

producing an emission synchronization signal prior to starting light emission from the excimer laser;

starting, subsequent to producing the emission synchronization signal and prior to starting light emission from the excimer laser, integration of an information signal based on the output produced by the photoelectric sensor;

stopping the integration prior to producing a next emission synchronization signal; and controlling exposure of the wafer to the mask pattern with the pulsed laser light emitted form the excimer laser, on the basis of a result of the integration.

6. A method according to claim 5, further comprising starting the integration with a predetermined delay after producing the emission synchronization signal.

7. A method according to claim 6, further comprising stopping the integration with a predetermined time lapse after starting the integration.

8. A method according to claim 5, further comprising intermittently repeating the production of an emission synchronization signal, the emission of a laser pulse from the excimer laser, and the integration of an information signal, successively accumulating successive results of the integration, and comparing the result of the accumulation at a certain time period with a predetermined result, for each emission of a laser pulse form the excimer laser.

9. A method according to claim 8, further comprising stopping the light emission from the excimer laser when the result of the accumulation becomes not less than a predetermined result.

10. A method according to claim 5, further comprising producing each emission synchronization signal in response to a trigger signal from a thyratron of the excimer laser.

11. An exposure method for exposing a semiconductor wafer to a pattern of a mask with pulsed laser light emitted from an excimer laser, to transfer the pattern of the mask onto the wafer, said method comprising the steps of:

providing a photoelectric sensor for receiving a portion of the pulsed laser light emitted from the excimer laser and for producing an output;

placing the mask at a predetermined first position;

placing the wafer at a predetermined second position for transferring the mask pattern to the wafer;

producing an emission synchronization signal prior to starting light emission from the excimer laser;

starting, subsequent to producing the emission synchronization signal and prior to starting the light emission from the excimer laser, integration of an information signal based on the output produced by the photoelectric sensor;

stopping the integration subsequent to completing the emission of a laser pulse from the excimer laser;

intermittently repeating the production of an emission synchronization signal, the emission of a laser pulse from the excimer laser, and the integration of an information signal for obtaining successive results by the repeated integration;

accumulating a respective integration result for each emission of a laser pulse from the excimer laser; and controlling exposure of the wafer to the mask pattern with the pulsed laser light emitted from the excimer laser, on the basis of a result of the accumulation.

12. A method according to claim 11, further comprising starting the integration with a predetermined delay after producing a corresponding emission synchronization signal.

13. A method according to claim 12, further comprising stopping the integration with a predetermined time lapse after starting the integration.

14. A method according to claim 11, further comprising stopping the light emission from the excimer laser when the result of the accumulation becomes not less than a predetermined result.

* * * * *